United States Patent
Narasimha et al.

(10) Patent No.: US 8,423,013 B2
(45) Date of Patent: Apr. 16, 2013

(54) MINIMIZING MEASUREMENTS DURING CARRIER AGGREGATION IN A WIRELESS COMMUNICATION SYSTEM

(75) Inventors: Murali Narasimha, Lake Zurich, IL (US); Ravi Kuchibhotla, Gurnee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 246 days.

(21) Appl. No.: 13/099,848

(22) Filed: May 3, 2011

(65) Prior Publication Data
US 2011/0281578 A1   Nov. 17, 2011

Related U.S. Application Data

(60) Provisional application No. 61/345,578, filed on May 17, 2010.

(51) Int. Cl.
*H04W 24/00* (2009.01)
*H04W 72/00* (2009.01)

(52) U.S. Cl.
USPC ........................................ 455/423; 455/452.2

(58) Field of Classification Search .......... 455/423–425, 455/450–454
See application file for complete search history.

(56) References Cited

U.S. PATENT DOCUMENTS
2010/0015967 A1   1/2010  Perets et al.
2011/0244804 A1*  10/2011 Wu ............................ 455/67.11

FOREIGN PATENT DOCUMENTS
WO     2010015286 A1   2/2010

OTHER PUBLICATIONS

Patent Cooperation Treaty, "PCT Search Report and Written Opinion of the International Searching Authority" for International Application No. PCT/US2011/036055, Aug. 3, 2011, 11 pages.
Chang et al., "A Fractional Soft Handover Scheme for 3GPP LTE-Advanced System" IEEE ICC Workshops 20009, Piscataway, NJ, USA, Jun. 14, 2009, pp. 1-5.
3GPP TSG RAN WG2 #69bis R2-101998 "Carrier Aggregation and the s-Measure Criterion" Ericsson, ST-Ericsson, Beijing, China, Apr. 12-16, 2010, 4 pages.

* cited by examiner

*Primary Examiner* — Steven Lim

(57) ABSTRACT

A method in a mobile station including configuring the mobile station for carrier aggregation on at least a primary serving cell and a secondary serving cell, configuring the mobile station to perform measurements of cells operating on at least the primary carrier frequency and the secondary carrier frequency, refraining from triggering a measurement report when a neighbor cell operating on the primary carrier frequency is better than the primary serving cell only if a signal level of the primary serving cell is better than a first threshold, and triggering a measurement report when a neighbor cell operating on the secondary carrier frequency is better than the secondary serving cell only if the signal level of the primary serving cell is worse than a second threshold.

12 Claims, 4 Drawing Sheets

MINIMIZING MEASUREMENTS DURING CARRIER AGGREGATION IN A WIRELESS COMMUNICATION SYSTEM

CROSS REFERENCE TO RELATED APPLICATIONS

The present application claims benefits under 35 U.S.C. 119 to U.S. provisional Application No. 61/345,578 filed on 17 May 2010, the contents of which are incorporated herein by reference.

FIELD OF THE DISCLOSURE

The present disclosure relates generally to wireless communications, and more specifically to Carrier Aggregation.

BACKGROUND

Carrier Aggregation will be used in future LTE networks to provide improved data rates to users. Carrier aggregation consists of transmitting data to or receiving data from the UE on multiple carrier frequencies ("component carriers"). The wider bandwidth enables higher data rates. Thus the UE can be configured, for communication, with multiple component carriers. Here communication involves transmission and/or reception of data and signaling. Some of these component carriers may be "activated". If a component carrier is activated, it can be used for data transmission to the UE. Configured component carriers are candidates for activation; that is, based on the arrival of a significant amount of data, one or more of the configured component carriers can be activated.

The UE is required to perform various radio resource management measurements to support component carrier (CC) management and to support mobility during carrier aggregation operation. CC management can include addition of CCs to, removal of CCs from and replacement of CCs in the configured CC set. Mobility can include handovers of the UE between eNBs, between sectors of an eNB, between remote radio heads connected to the same eNB and between repeaters of the same eNB. Such measurements can be a significant drain of the UE battery—particularly because with carrier aggregation, the UE would be performing measurements of more frequencies that if carrier aggregation were not used. The present disclosure concerns the measurements performed on the component carriers and tries to minimize them.

In LTE Release 8, a parameter called "s-Measure" can be defined by the network. The s-Measure indicates a signal strength or signal quality level. If the UE finds the signal of the serving cell to be below the s-Measure, it performs measurements of other frequencies (i.e., frequencies other than the serving frequencies) and other radio access technologies (such as UMTS and GSM). If the UE finds the signal of the serving cell to be above the s-Measure it can avoid performing measurements (the rationale being that if the serving cell measurements are high, then there is no immediate need to handover the UE to another cell, and therefore no need for measurements and measurement reports). Thus, the s-Measure enables significant battery savings for the UE.

With Carrier aggregation, a UE can be configured with multiple carriers from the same eNB. Thus the UE can have multiple serving cells, each serving cell operating on a different carrier. One of these serving cells is designated as the P-cell (the corresponding downlink CC is referred to as the primary component carrier or PCC) and the other serving cells are designated as the S-cells (the corresponding downlink CCs are referred to as the secondary component carriers or SCCs).

It is possible to use the s-Measure parameter provided by the P-cell to control all measurements; that is, the UE uses the P-cell as the reference for the s-Measure and it can avoid all measurements (including measurements of cells on SCCs) when the P-cell signal is above the s-Measure. However, this results in not being able to effectively perform CC management decisions—i.e., without measurements on SCCs, the network cannot determine when to add/remove/replace CCs.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
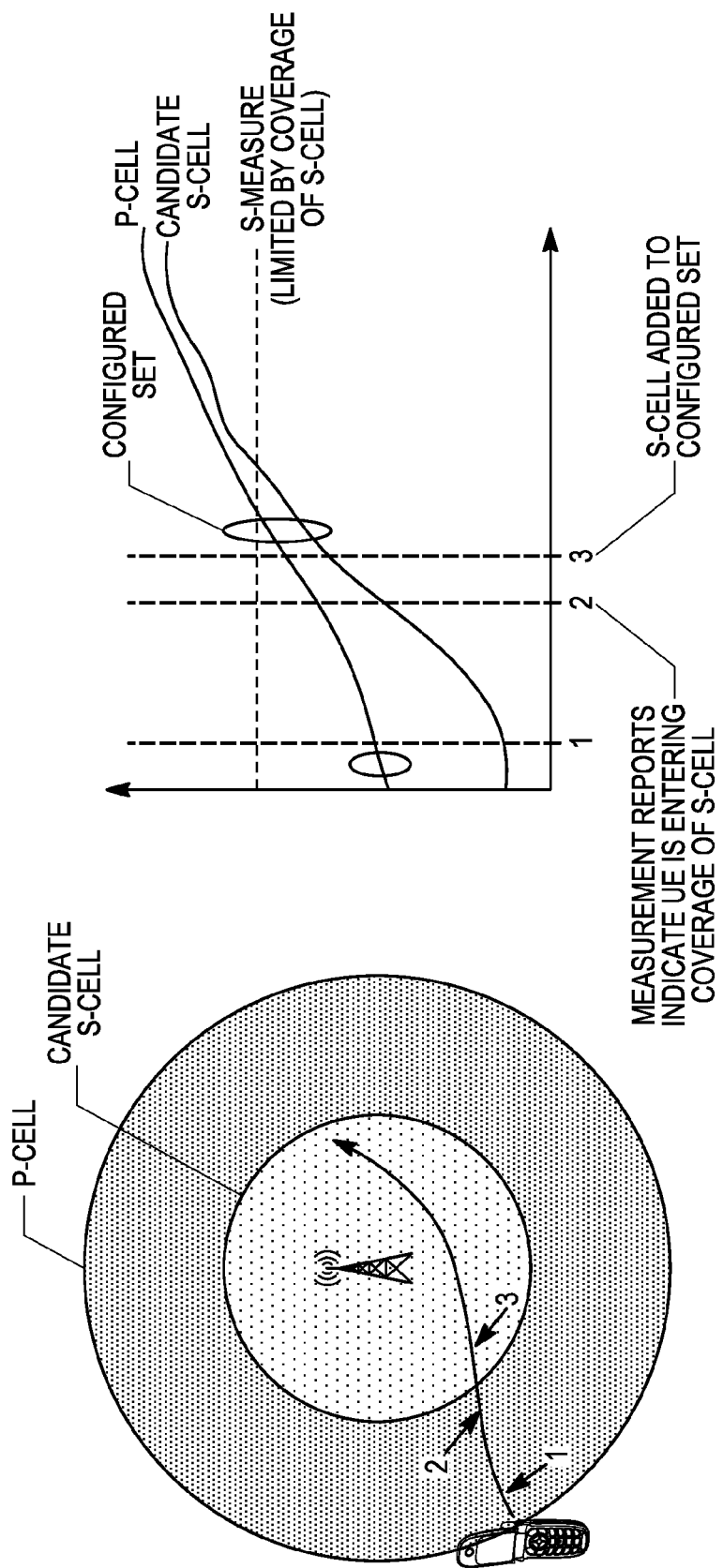
FIG. 1 shows difficulty of adding a SCC using s-Measure$^{P\text{-}cell}$.

Illustrative embodiments of the disclosure are described below. In the interest of clarity, not all features of an actual implementation are described in this specification. It will be appreciated that in the development of an actual embodiment, numerous implementation-specific decisions should be made to achieve specific goals, such as compliance with system-related and business-related constraints, which will vary from one implementation to another. It will also be appreciated that such a development effort may be complex and time-consuming, but would nevertheless be a routine undertaking for those of ordinary skill in the art having the benefit of this present disclosure.

Portions of the invention and corresponding detailed description are presented in terms of software or algorithms and symbolic representations of operations on data within a computer processor or memory. These descriptions and representations are how those of ordinary skill in the art effectively convey the substance of their work to others having ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has is convenient at times, principally for reasons of common usage, to refer to these signals as bits, values, elements, symbols, characters, terms, numbers, or the like.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

An LTE UE that is not configured for carrier aggregation typically performs the following types of radio resource management measurements: intra-frequency measurements where the measured cell is on the same carrier frequency as the serving cell, inter-frequency measurements where the measured cell is on carrier frequency different from the serving cell and inter-RAT measurements where the measured cell is a cell of a different radio access technology (RAT). The actual measurements performed are subject to configuration by the network. Some or all measured results are sent to the network in measurement report messages. Measurement events define when the UE transmits measurement reports. A measurement event is triggered when a certain measurement related event occurs (for example, when a neighbor cell signal is better than the serving cell signal). When the measurement event is triggered, the UE transmits a measurement report to the network. Thus, the UE can trigger a measurement report when a neighbor cell is better than the serving cell, which results in the UE transmitting a measurement report to the network. The UE can consider the neighbor cell to be better than the serving cell if the neighbor cell signal is higher than the serving cell signal plus an offset. The measurement report includes measurements that triggered the measurement event and can include measurements of other cells. The configuration of measurements for radio resource management is independent of configuration of component carrier frequencies for the purpose of carrier aggregation. For example, carrier frequencies F1 and F2 can be configured component carriers, but the UE may be configured to perform radio resource management measurements of cells on carrier frequencies F1, F2 and F3.

Measurement events can be classified as follows (detailed specification of measurement events is in 3GPP TS 36.331):

Category 1: Measurement events triggered by measurements of serving cell only or by comparison of neighbor cells to the serving cell: these include events A1 (serving cell becomes better than threshold); A2 (serving cell becomes worse than threshold); and A3 (neighbor cell becomes offset better than serving cell).

Category 2: Measurement events triggered by measurements of neighbor cells only or by a combination of measurements of neighbor cells and measurements of serving cell: these include events A4 (neighbor cell becomes worse than threshold); A5 (serving cell becomes worse than threshold1 and neighbor cell becomes better than threshold2); B1 (inter-RAT neighbor becomes better than threshold) and B2 (serving cell becomes worse than threshold1 and inter-RAT neighbor cell becomes worse than threshold2).

In the absence of carrier aggregation, a single s-Measure can be provided to the UE. If the serving cell signal is better than the s-Measure, then the UE is not required to perform any measurements; as a consequence, measurement events are not triggered and the UE does not transmit measurement reports. The s-Measure value is selected by the network such that, with the serving cell signal at or above the s-Measure, the UE is very unlikely to need a handover. This mechanism results in substantial battery savings for UEs as large numbers of UEs are typically in good coverage (i.e., the serving cell signal being better than s-Measure). It should be noted that the value of the offset in measurement events that consist of an offset (for example, A3) can be a negative value.

When the UE is configured for carrier aggregation, it has multiple serving cells, one cell on each of the carriers configured for CA. The serving cell on the primary component carrier is designated as the primary serving cell (P-cell). The other serving cells are designated as the secondary serving cells (S-cells). Cells that are not serving cells are considered as neighbor cells (including intra-frequency, inter-frequency and inter-RAT cells). Measurement events in addition to the ones mentioned above are needed for (a) addition/removal of carriers to the configured CC set, and (b) performing timely handovers between cells on the secondary component carriers.

An LTE UE that is configured for carrier aggregation typically performs the following types of measurements: intra-frequency measurements where the measured cell is on the same carrier frequency as one of the serving cells, inter-frequency measurements where the measured cell is on a carrier frequency different from the serving cells and inter-RAT measurements where the measured cell is a cell of a different radio access technology (RAT). Measurement events needed in the presence of carrier aggregation can be classified as follows:

Category 1a: Measurement events triggered by measurements of primary serving cell only or by comparison of neighbor cells to the primary serving cell: these include events A1-PCC (P-cell becomes better than threshold); A2-PCC (P-cell becomes worse than threshold); and A3-PCC (neighbor cell becomes offset better than P-cell).

Category 1b: Measurement events triggered by measurements of secondary serving cell only or by comparison of neighbor cells to a secondary serving cell: these include events A1-SCC (S-cell becomes better than threshold); A2-SCC (S-cell becomes worse than threshold); and A3-intra-frequency (neighbor cell on the same frequency as S-cell becomes offset better than S-cell). Note that events involving comparison of a non-serving cell on one frequency to an S-cell on another frequency are not necessary for both carrier management and for mobility.

Category 2': Measurement events triggered by measurements of neighbor cells only or by a combination of measurements of neighbor cells and measurements of the primary serving cell: these include events A4 (neighbor cell becomes worse than threshold); A5 (P-cell cell becomes worse than threshold1 and neighbor cell becomes better than threshold2); B1 (inter-RAT neighbor becomes better than threshold) and B2 (P-cell becomes worse than threshold1 and inter-RAT neighbor cell becomes worse than threshold2). Note that events involving combinations of measurements of neighbor cells and measurements of S-cells are not necessary for carrier management or for mobility.

Now we address the question of how the s-Measure can be used to minimize measurements in the presence of carrier aggregation. We first consider the impact of using the s-Measure that is used when carrier aggregation is not configured also for the case when carrier aggregation is configured. Given that when carrier aggregation is configured the UE can have multiple serving cells, it is necessary to define which cell serves as the reference cell for the s-Measure (i.e., the cell whose signal is compared to the s-Measure). It is natural to use the P-cell as the reference cell. For clarity, we refer to this s-Measure as s-Measure$^{P\text{-}cell}$. We consider a scenario where the UE is configured with two carriers one of which has a smaller coverage than the other, as illustrated in FIG. 1.

At point 1, the UE is configured with only the PCC. When the UE arrives into the coverage of the candidate S-cell, the SCC should be added to the configured set. In order to know when the UE is entering the coverage of the S-cell coverage, it is necessary to perform A3-PCC measurements comparing the P-cell to the cells on the SCC, even if the P-cell signal is good. Given that there is no S-cell on the second carrier, measurement events A1-SCC, A2-SCC and A3-intra-frequency are not triggered. Thus the s-Measure$^{P\text{-}cell}$ is limited by the coverage of the candidate S-cell. In other words, to ensure proper CC removal and addition behavior, the value of s-Measure$^{P\text{-}cell}$ needs to be such that measurement reports are triggered when UE approaches the edge of coverage of any of the candidate S-cells. Limiting the s-Measure$^{P\text{-}cell}$ to the coverage of the S-cell would imply a significantly larger area where the UE would need to perform measurements (compared to the case where carrier aggregation is not implemented by the network).

An alternate mechanism wherein a second s-Measure is linked to an S-cell can be considered. For clarity, we refer to this s-Measure as s-Measure$^{S\text{-}cell}_i$, where S-cell$_i$ is one of the secondary serving cells. s-Measure$^{S\text{-}cell}_i$ can control the category 1b measurement events. That is, if the S-cell$_i$ signal is better than s-Measure$^{S\text{-}cell}_i$, then the UE is not required to perform measurements required for category 1b measurement events (these include measurements of S-cell$_i$ and measurements of neighbor cells on the same frequency as S-cell$_i$). With such a mechanism involving both the s-Measure$^{P\text{-}cell}$ and the s-Measure$^{S\text{-}cell}_i$, the network can select a relatively low value for s-Measure$^{P\text{-}cell}$ and a relatively low value for s-Measure$^{S\text{-}cell}_i$. This enables the network to ensure that the UE continues to perform measurements for category 1b events (e.g., intra-frequency measurements on secondary component carriers) even when the P-cell signal is better than s-Measure$^{P\text{-}cell}$ and measurements for category 1a events are not required.

Figure 2:
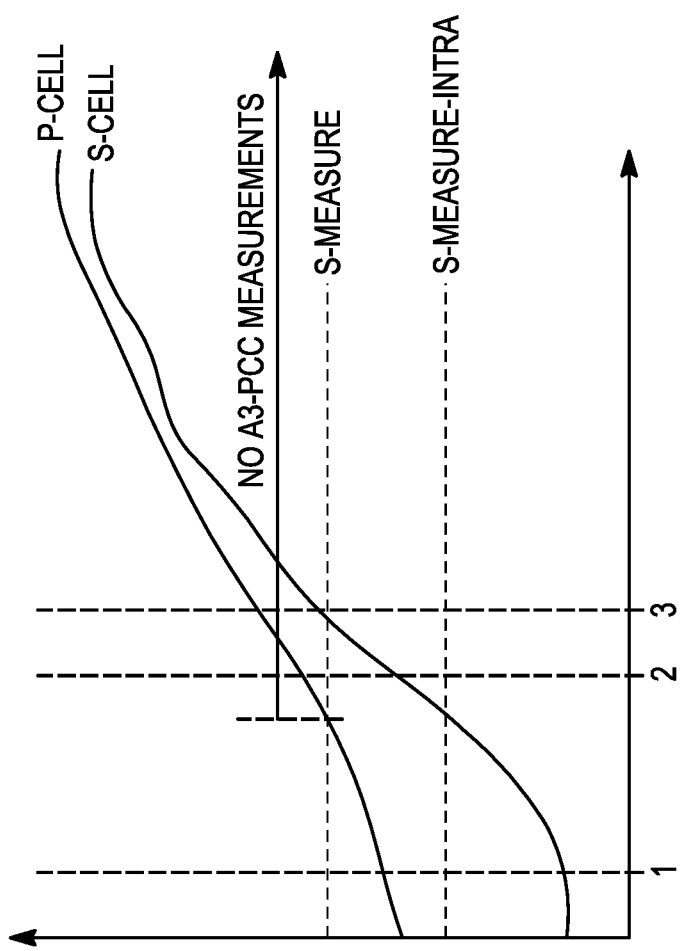
FIG. 2 shows difficulty in discovering a SCC using a s-measure linked to a S-cell.

Thus, such a mechanism may be beneficial when UE has an S-cell$_i$. However, it cannot help in discovering a candidate S-cell$_i$. For example, in the scenario shown in FIG. 1, this alternative does not allow for the addition of the SCC. As illustrated in FIG. 2, at points 1 and 2, UE will only be configured with the PCC. By the time the UE gets to point 2, A3-PCC measurements have been turned off based on the s-Measure$^{P\text{-}cell}$. Meanwhile, given that there is no S-cell$_i$, A1/A2 and A3 intra-frequency events are not triggered. Therefore the network does not know when the UE enters the coverage of the candidate S-cell.

According to an embodiment of the invention, the UE is configured with two alternate s-Measures:

s-Measure-Alt$^{P\text{-}cell}$ is defined to control: (a) category 2' measurement events, and (b) category 1a measurement events which do not involve measurements of cells on configured component carriers. These events include A4, A5, B1, B2, A1-PCC and A2-PCC. Also included are A3-PCC events where the neighbor cell is not on a configured component carrier. The P-cell is used as the reference cell for the s-Measure-Alt$^{P\text{-}cell}$. Thus, if the P-cell signal is better than s-Measure-Alt$^{P\text{-}cell}$ the UE can avoid performing the following measurements: measurements where the measured cell is on a carrier frequency different from the serving cells, and measurements where the measured cell is a cell of a different radio access technology (RAT).

s-Measure$^{S\text{-}cell}_i$ (ref P-cell) is defined to control (a) category 1b measurement events, and (b) category 1a measurement events which involve measurements of cells on configured component carriers. These events include A1-SCC, A2-SCC and A3-intra-frequency. Also included are A3-PCC events where the neighbor cell is on a configured secondary component carrier. The P-cell is used as the reference cell for s-Measure$^{S\text{-}cell}_i$ (ref P-cell). Thus, if the P-cell signal is better than s-Measure$^{S\text{-}cell}_i$ (ref P-cell), the UE can avoid performing the following measurements: measurements of S-cells; and measurements of neighbor cells on SCCs.

Figure 3:
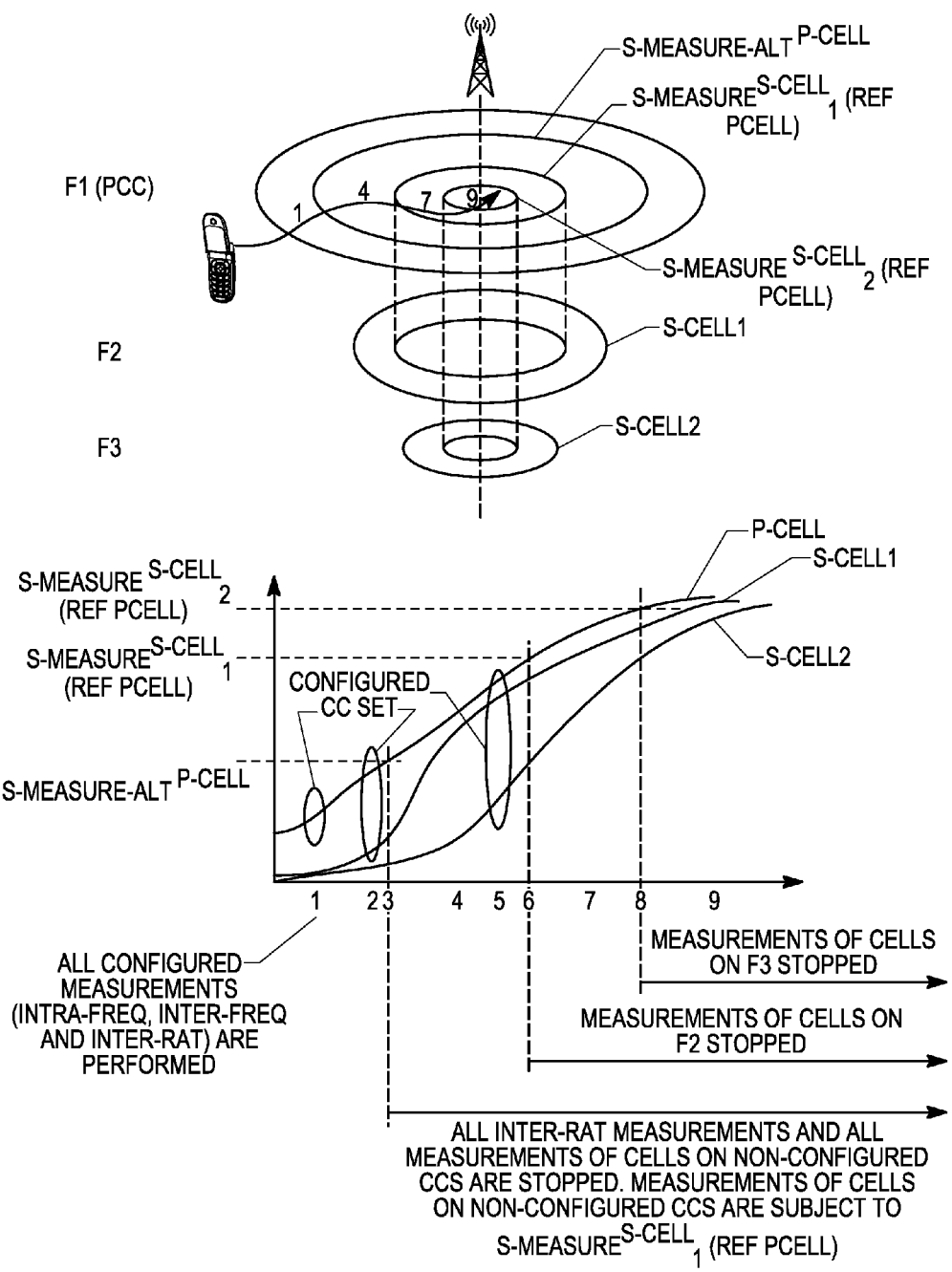
FIG. 3 shows the mechanism for minimizing measurements using an alternate s-Measure with the primary cell as the reference.

FIG. 3 illustrates an embodiment comprising the use of s-Measure-Alt$^{P\text{-}cell}$ and s-Measure$^{S\text{-}cell}_i$ (ref P-cell). The scenario depicted in FIG. 3 consists of 3 carriers F1, F2 and F3. F1 is configured as the primary component carrier. At location 1, UE is required to perform all configured measurements, and consequently any configured measurement events can be triggered. As the UE moves from point 1 to point 9, UE can choose to avoid making certain measurements. This is described in more detail below.

At location 2, carrier F2 is added to the configured CC set; consequently, the UE may be required to perform measurements of cells on F2 if configured to do so. At location 3, the P-cell signal is better than s-Measure-Alt$^{P\text{-}cell}$, and consequently the UE can avoid performing measurements of inter-RAT cells and cells on carrier frequencies that are not secondary component carriers (that is, the UE is not required to perform majority of the measurements including measurements of cells on carrier F3). At location 3 and location 4, measurements of cells on carrier F2 continue.

At location 5, carrier F3 is added to the configured CC set; consequently, the UE may be required to perform measurements of cells on F3 if configured to do so. At location 6, the P-cell signal is better than s-Measure$^{S\text{-}cell}_1$ (ref P-cell), and consequently the UE can avoid performing measurements of cells on carrier F2. At location 6 and location 7, measurements of cells on carrier F3 continue.

At location 8, the P-cell signal is better than s-Measure$^{S\text{-}cell}_2$ (ref P-cell), and consequently the UE can avoid performing measurements of cells on carrier F3. Thus, at location 9, the UE is only required to perform measurements of cells on the primary CC.

In the preceding scenario, a carrier is added to the configured CC set when there is a candidate S-cell on the carrier that the UE can synchronize to. Alternatively, it is possible to add a carrier to the configured CC set when there isn't a candidate S-cell on the carrier that the UE can synchronize to. Similarly, it is possible to keep a carrier in the configured CC set (that is, not remove it from the configured CC set) when there isn't a candidate S-cell on the carrier that the UE can synchronize to. With such an approach, at location 1 in the scenario of FIG. 3, the UE the configured CC set can comprise F1, F2 and F3. Then, upon the stopping inter-RAT measurements and measurements of cells on non-configured CCs at location 3, the UE continues to perform measurements of cells on F2 and F3.

In the above embodiment, the UE is required to not stop measurements of cells on the PCC. In some deployments, it is not necessary to continue measuring the cells on the PCC if the serving cell signal is sufficiently good. According to another embodiment, s-Measure-Alt$^{P\text{-}cell}$ is modified to allow the UE to stop performing measurements of cells on the PCC if the serving cell signal is sufficiently good. s-Measure-Alt2$^{P\text{-}cell}$ defined below can be used instead of s-Measure-Alt$^{P\text{-}cell}$.

s-Measure-Alt2$^{P\text{-}cell}$ is defined to control: (a) category 2' measurement events, and (b) category 1a measurement events which do not involve measurements of cells on configured secondary component carriers. These events include A4, A5, B1, B2, A1-PCC and A2-PCC. Also included are A3-PCC events where the neighbor cell is not on a configured secondary component carrier. The P-cell is used as the reference cell for the s-Measure-Alt2$^{P\text{-}cell}$. Thus, if the P-cell signal is better than s-Measure-Alt2$^{P\text{-}cell}$ the UE can avoid performing the following measurements: measurements where the measured cell is on a carrier frequency different from the serving cells, measurements where the measured cell is on the same carrier frequency as the P-cell, and measurements where the measured cell is a cell of a different radio access technology (RAT).

Based on s-Measure-Alt2$^{P\text{-}cell}$, at location 3 in the scenario of FIG. 3 the UE can stop performing measurements of cells on the PCC, in addition to stopping inter-RAT measurements and measurements of cells on non-configured component carriers.

Figure 4:
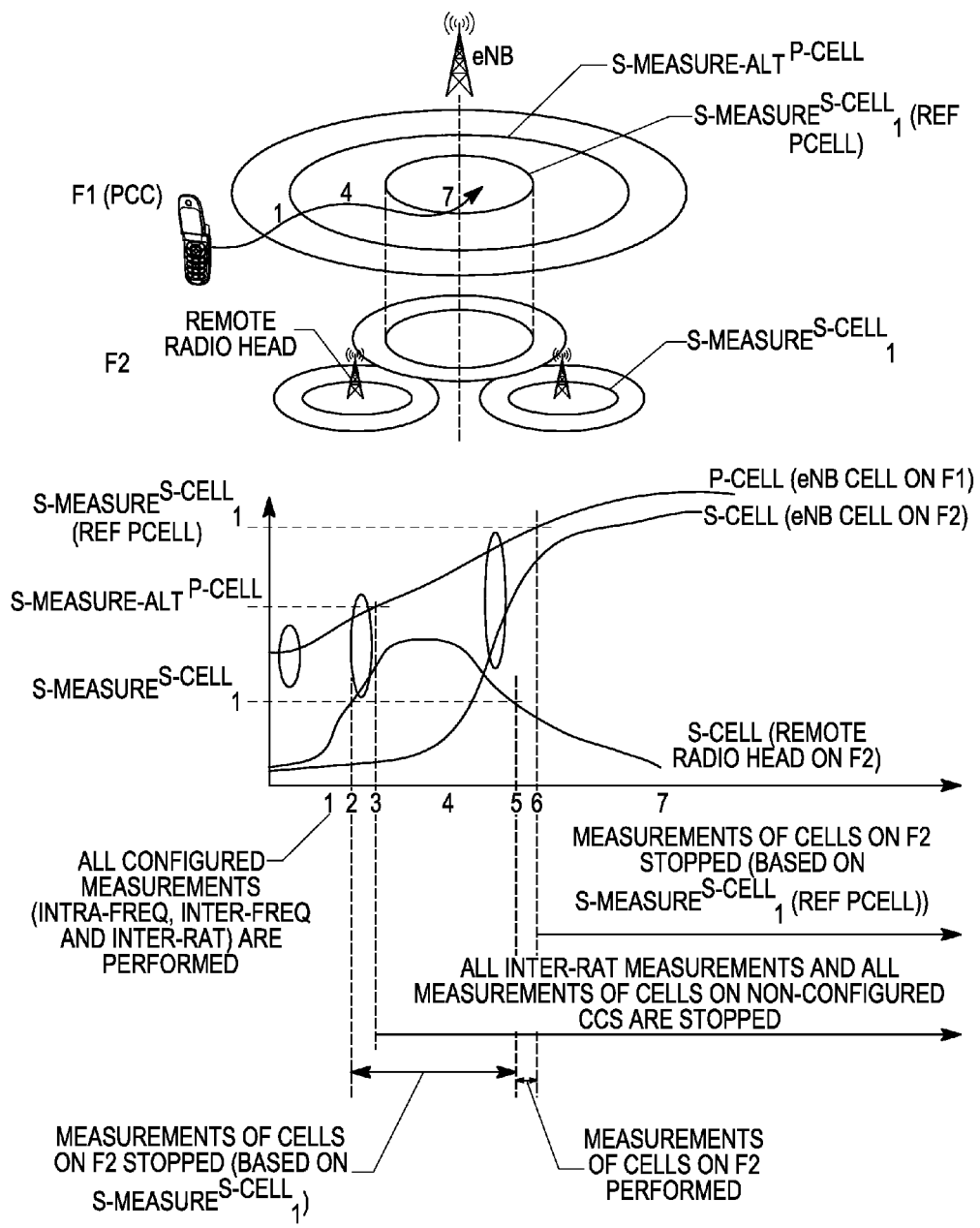
FIG. 4 shows mechanism for minimizing measurements using an alternate s-Measure with the primary cell as the reference in a scenario using remote radio heads.

According to another embodiment, in the presence of remote radio heads or repeaters, it may be necessary to use s-Measure$^{S\text{-}cell}_i$ in addition to s-Measure-Alt$^{P\text{-}cell}$ and s-Measure$^{S\text{-}cell}_i$ (ref P-cell). This is illustrated in FIG. 4. Remote radio heads are deployed on frequency F2. The eNB supports communication on both frequency F1 and F2. F1 and F2 can be configured component carriers. Carrier aggregation can be performed with the transmissions from the eNB on F1 and a remote radio head on F2. Carrier aggregation can also be performed with the transmissions from the eNB on F1 and the eNB on F2. The UE is configured with s-Measure-Alt$^{P\text{-}cell}$, s-Measure$^{S\text{-}cell}_i$ (ref P-cell) and s-Measure$^{S\text{-}cell}_i$.

At location 1, UE is required to perform all configured measurements, and consequently any configured measurement events can be triggered. As the UE moves from point 1 to point 7, it can choose to avoid making certain measurements. This is described in more detail below.

At location 2, the S-cell signal is better than s-Measure$^{S\text{-}cell_i}$, and consequently the UE can avoid performing measurements of cells on F2. At location 3, the P-cell signal is better than s-Measure-Alt$^{P\text{-}cell}$, and consequently the UE can avoid performing measurements of inter-RAT cells and cells on carrier frequencies that are not secondary component carriers.

At location 4, the UE can avoid performing all measurements. At location 5, the S-cell signal is worse than s-Measure$^{S\text{-}cell}_1$, and consequently the UE can perform measurements of cells on F2.

At location 6, the P-cell signal is better than s-Measure$^{S\text{-}cell}_i$ (ref P-cell), and consequently the UE can stop performing measurements of cells on F2.

Between location 4 and location 6, the UE changes the serving cell on F2 (from the remote radio head cell on F2 to the eNB cell on F2). When the remote radio head cell on F2 is the S-cell, the UE uses s-Measure$^{S\text{-}cell}_i$ (ref P-cell) to control (a) category 1b measurement events, and (b) category 1a measurement events which involve measurements of cells on configured component carriers. When the eNB cell on F2 is the S-cell, the UE uses s-Measure$^{S\text{-}cell}_1$ (ref P-cell) to control (a) category 1b measurement events, and (b) category 1a measurement events which involve measurements of cells on configured component carriers.

Remote radio equipment (such as repeaters and remote radio heads) can be used to extend coverage on a particular frequency or to provide localized "hot-spot" coverage on a particular frequency. The remote radio equipment can be located at a substantially different location compared to the location of the eNB. The eNB can transmit the same information in cells of remote radio equipment as it does on regular cells (i.e. cells of the eNB). Therefore, transmissions from the remote radio equipment can appear to be transmissions from the eNB (for example, system information in the transmissions from the remote radio equipment can identify the source of the transmission as the eNB). If the UE applies s-Measure$^{S\text{-}cell}_i$ (ref P-cell) as described above when S-cell$_i$ is a cell of a remote radio equipment, the UE may prematurely stop performing measurements of cells on F2. Therefore, in the presence of remote radio equipment, it is beneficial to use s-Measure$^{S\text{-}cell}_i$ (i.e., an s-Measure linked to the S-cell). Thus, it is necessary for the UE to determine whether a cell is a cell of a remote radio equipment. In one embodiment, the UE can determine whether the S-cell on F2 is a remote radio equipment cell or a cell of the eNB using one or more of the methods below:

The UE can estimate the path loss of the signal from the eNB cell on F1 and compare it to the path loss from the S-cell on F2. If the path loss values are substantially different it can indicate that the S-cell is a remote radio head cell.

The UE can estimate the angle of arrival of the signal from the eNB cell on F1 and compare it to the angle of arrival from the S-cell on F2. If the angle of arrival values are substantially different, it can indicate that the S-cell is a remote radio head.

The network can include an indicator in a downlink message (for example in a broadcast channel message, such as a system information block) indicating whether a cell is an eNB cell or a remote radio head. The UE can acquire such an indicator by acquiring, for example, the system information of the S-cell.

While the above embodiments have been described in terms of absolute thresholds for the various s-Measure parameters, it should be noted that s-Measure parameters can also be defined in an inter-dependent manner. For example, s-Measure$^{S\text{-}cell}_i$ (ref P-cell) can be specified to be offset by x db from the s-Measure-Alt2$^{P\text{-}cell}$.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a mobile station for minimizing measurement reporting in connected mode, the method comprising:
    configuring the mobile station for carrier aggregation on at least a primary serving cell and a secondary serving cell, the primary serving cell operating on a primary carrier frequency and the secondary serving cell operating on a secondary carrier frequency;
    further configuring the mobile station to perform measurements of cells operating on at least the primary carrier frequency and the secondary carrier frequency;
    refraining from triggering a measurement report when a neighbor cell operating on the primary carrier frequency is better than the primary serving cell only if a signal level of the primary serving cell is better than a first threshold; and
    triggering a measurement report when a neighbor cell operating on the secondary carrier frequency is better than the secondary serving cell only if the signal level of the primary serving cell is worse than a second threshold.

2. The method according to claim 1 wherein the first threshold is obtained by adding an offset value to the second threshold.

3. The method according to claim 1 wherein refraining from triggering a measurement report includes:
refraining from triggering a measurement report when a signal level of the neighbor cell operating on the primary carrier frequency is higher than the signal level of the primary serving cell plus an offset only if the signal level of the primary serving cell is better than the first threshold.

4. The method according to claim 1 wherein triggering a measurement report includes:
triggering a measurement report when the signal level of the neighbor cell operating on the secondary carrier frequency is better than a signal level of the secondary serving cell plus an offset only if the signal of the primary serving cell is worse than the second threshold.

5. The method according to claim 1 further comprising
configuring the mobile station to perform measurements of cells operating on one or more carrier frequencies not configured for carrier aggregation; and
triggering a measurement report when a neighbor cell operating on a carrier frequency not configured for carrier aggregation is better than the primary serving cell only if the signal of the primary serving cell is worse than the second threshold.

6. The method according to claim 1 further comprising triggering a measurement report when a neighbor cell operating on the secondary carrier frequency is better than the primary serving cell only if the signal of the primary serving cell is worse than the second threshold.

7. The method of claim 1 further comprising:
determining that the secondary serving cell is a cell of a remote radio equipment;
refraining from triggering a measurement report when the neighbor cell on the secondary carrier frequency is better than the secondary serving cell if a signal of the secondary serving cell is better than a third threshold.

8. A method in a wireless communications base station, the method comprising:
configuring a mobile station for carrier aggregation on at least a primary serving cell and a secondary serving cell, the primary serving cell operating on a primary carrier frequency and the secondary serving cell operating on a secondary carrier frequency;
configuring the mobile station to refrain from performing measurement reporting when a neighbor cell operating on a primary carrier frequency is better than the primary serving cell only if a signal level of the primary serving cell is worse than a first threshold;
configuring the mobile station to perform measurement reporting when a neighbor cell operating on the secondary carrier frequency is better than the secondary serving cell only if the signal level of the primary serving cell is worse than a second threshold;
receiving a measurement report from the mobile station, the measurement report in response to a signal level of a first neighbor cell operating on the secondary carrier frequency being better than a signal level of the secondary serving cell and the signal level of the primary serving cell being worse than the second threshold; and
replacing the secondary serving cell with the first neighbor cell.

9. The method according to claim 8 further comprising:
configuring the mobile station to perform measurements of cells operating on one or more carrier frequencies not configured for carrier aggregation;
receiving a measurement report from the mobile station, the measurement report in response to a signal level of a second neighbor cell operating on a carrier frequency not configured for carrier aggregation being better than the signal level of the primary serving cell and the signal level of the primary serving cell being worse than the second threshold; and
configuring the mobile station for carrier aggregation on the second neighbor cell.

10. The method according to claim 8 further comprising:
configuring the mobile station for carrier aggregation on a third carrier frequency in the absence of a serving cell on the third carrier frequency;
receiving a measurement report from the mobile station, the measurement report in response to a signal level of a third neighbor cell operating on the third carrier frequency being better than the signal level of the primary serving cell and the signal level of the primary serving cell being worse than the second threshold; and
configuring the third neighbor cell as the serving cell on the third carrier frequency.

11. The method according to claim 8 wherein the first threshold is obtained by adding a predefined offset value to the second threshold.

12. The method according to claim 8, wherein the secondary serving cell is a cell of a remote radio equipment, the method further comprising:
configuring the mobile station to perform measurement reporting when a neighbor cell operating on the secondary carrier frequency is better than the secondary serving cell only if the signal level of the secondary serving cell is worse than a third threshold;
receiving a measurement report from the mobile station, the measurement report in response to the mobile station determining that the secondary serving cell is a cell of a remote radio equipment and a signal of a fourth neighbor cell operating on the secondary carrier frequency being better than the secondary serving cell; and
replacing the secondary serving cell with the fourth neighbor cell.

* * * * *